US012088369B2

(12) United States Patent
Kwon et al.

(10) Patent No.: US 12,088,369 B2
(45) Date of Patent: Sep. 10, 2024

(54) METHOD AND APPARATUS FOR LEARNING-BASED CHANNEL MATRIX PREDICTION

(71) Applicant: Samsung Electronics Co., Ltd., Gyeonggi-do (KR)

(72) Inventors: Hyukjoon Kwon, San Diego, CA (US); Mohamed Mahmoud, Richardson, TX (US); Federico Penna, San Diego, CA (US); Yanlin Zhou, San Diego, CA (US); Ramy E. Ali, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 9 days.

(21) Appl. No.: 18/091,641

(22) Filed: Dec. 30, 2022

(65) Prior Publication Data
US 2024/0063852 A1    Feb. 22, 2024

Related U.S. Application Data

(60) Provisional application No. 63/399,856, filed on Aug. 22, 2022.

(51) Int. Cl.
*H04B 7/0456* (2017.01)
*H04L 5/00* (2006.01)
*H04W 72/0446* (2023.01)
*H04W 72/0453* (2023.01)

(52) U.S. Cl.
CPC ......... *H04B 7/0456* (2013.01); *H04L 5/0023* (2013.01); *H04W 72/0446* (2013.01); *H04W 72/0453* (2013.01)

(58) Field of Classification Search
CPC ............... H04B 7/0456; H04L 5/0023; H04W 72/0446; H04W 72/0453
See application file for complete search history.

(56) References Cited

U.S. PATENT DOCUMENTS

| 9,363,002 B2* | 6/2016 | Khayrallah | H04B 7/0452 |
| 2021/0091838 A1 | 3/2021 | Bai et al. | |
| 2021/0209461 A1* | 7/2021 | Guo | G06N 3/04 |
| 2021/0266125 A1* | 8/2021 | Pezeshki | H04L 5/0048 |
| 2021/0267006 A1* | 8/2021 | Pezeshki | H04W 72/23 |
| 2021/0351885 A1 | 11/2021 | Chavva et al. | |
| 2022/0094412 A1 | 3/2022 | Ren et al. | |

(Continued)

FOREIGN PATENT DOCUMENTS

WO    WO 2013/166464    11/2013

OTHER PUBLICATIONS

Zhang, Yu et al., "Predicting Future CSI Feedback For Highly-Mobile Massive MIMO Systems", Cornell University, arXiv:2202.02492v1 [cs.IT] Feb. 5, 2022, pp. 6.

*Primary Examiner* — Khanh C Tran
(74) *Attorney, Agent, or Firm* — The Farrell Law Firm, P.C.

(57) ABSTRACT

Methods and apparatus are provided in which channel matrices at time slots are estimated using reference signals received from a base station (BS) at the time slots. A sequence of channel matrices at future time slots are estimated using the estimated channel matrices as input to a neural network (NN) trained based on known sets of past and future channel matrices. A parameter is determined using at least one channel matrix from the sequence of channel matrices.

20 Claims, 9 Drawing Sheets

(56) References Cited

U.S. PATENT DOCUMENTS

| | | |
|---|---|---|
| 2022/0123807 A1 | 4/2022 | Rose et al. |
| 2023/0035971 A1* | 2/2023 | Girnyk ................. H04B 7/0456 |
| 2023/0078979 A1* | 3/2023 | Ait Aoudia .............. H04B 1/06 375/267 |
| 2023/0403699 A1* | 12/2023 | Hajri ....................... H03M 7/30 |

* cited by examiner

METHOD AND APPARATUS FOR LEARNING-BASED CHANNEL MATRIX PREDICTION

CROSS-REFERENCE TO RELATED APPLICATION

This application claims the priority benefit under 35 U.S.C. § 119(e) of U.S. Provisional Application No. 63/399,856, filed on Aug. 22, 2022, the disclosure of which is incorporated by reference in its entirety as if fully set forth herein.

TECHNICAL FIELD

The disclosure generally relates to channel matrix estimation from reference signals. More particularly, the subject matter disclosed herein relates to improvements in predicting a channel matrix at future slots by applying machine learning (ML) techniques.

SUMMARY

In cellular systems such as $5^{th}$ generation (5G) new radio (NR), when operating in a frequency domain duplexing (FDD) mode, a base station (BS) (gNodeB (gNB) in NR) may apply a precoding matrix based on channel state information (CSI) reported by a user equipment (UE). In particular, in NR, the CSI report may include a CSI parameter, such as, for example, a precoding matrix indicator (PMI) that identifies a precoding matrix within a predefined codebook.

The UE determines the CSI parameter based on measured channel conditions. For example, the UE may perform singular value decomposition (SVD) of an estimated channel matrix (H) and select a PMI corresponding to a precoding matrix, from the predefined codebook, that best approximates the singular vectors of channel matrix H.

Channel matrix H is typically estimated from reference signals, such as, for example, a CSI reference signal (CSI-RS) in NR, which is transmitted by the gNB in a periodic fashion. In NR, individual CSI-RSs may be separated by a set interval of slots. Possible periodicities for the CSI-RS may include 5, 10, or 20 slots.

Upon receiving the CSI report from the UE, the gNB may apply a precoding matrix based on the report.

One issue with the above approach is that the aforementioned CSI reporting framework involves an inevitable delay between the time at which the UE estimates the channel matrix H and the time at which the gNB applies the precoding matrix. This delay results in an outdated CSI and, consequently, suboptimal precoding selection. The outdated CSI issue is more severe when the channel is fast-varying (e.g., having a high Doppler frequency), and when the CSI-RS is transmitted infrequently (e.g., with a long periodicity).

Learning-based channel prediction for selection of a precoding matrix and/or other CSI parameters may use an entire channel matrix as input to and output from a neural network (NN). However, issues related to the use of an incomplete history are not typically considered.

Even when issues related to use of an incomplete history are considered, conventional algorithms consider only a single past CSI-RS observation. That is, such algorithms estimate the channel matrix in all slots within a CSI-RS period and then leverage the estimated values to obtain estimates for all slots in a subsequent CSI-RS period. Thus, these conventional methods remain sensitive to error propagation issues, and therefore, are not sufficiently robust.

To overcome these issues, systems and methods are described herein that mitigate the outdated CSI problem by predicting a channel matrix at future slots through ML techniques.

The above approaches improve on previous methods because they predict a future channel matrix by taking past observations (e.g., channel matrix estimates from multiple CSI-RS slots) as input, with a certain periodicity, and provide a low complexity solution in which channel matrix prediction is performed element-wise, instead of using an entire channel matrix as input and output.

In an embodiment, a method includes estimating, by a UE, channel matrices at time slots using reference signal received from a BS at the time slots. The UE predicts a sequence of channel matrices at future time slots using the estimated channel matrices as input to an NN trained based on known sets of past and future channel matrices. The UE determines a parameter using at least one channel matrix from the sequence of channel matrices.

In an embodiment, a UE includes a processor and a non-transitory computer readable storage medium storing instructions. When executed, the instructions cause the processor to estimate channel matrices at time slots using reference signals received from a BS at the time slots. The instructions also cause the processor to predict a sequence of channel matrices at future time slots using the estimated channel matrices as input to an NN trained based on known sets of past and future channel matrices. The instructions further cause the processor to determine a parameter using at least one channel matrix from the sequence of channel matrices.

In an embodiment, a system includes a UE configured to receive reference signals, estimate channel matrices at time slots using the reference signals, predict a sequence of channel matrices at future time slots using the estimated channel matrices as input to an NN trained based on known sets of past and future channel matrices, determine a parameter using at least one channel matrix from the sequence of channel matrices, and transmit the parameter. The system also includes a BS configured to transmit the reference signals to the UE at the time slots, and receive the parameter from the UE.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
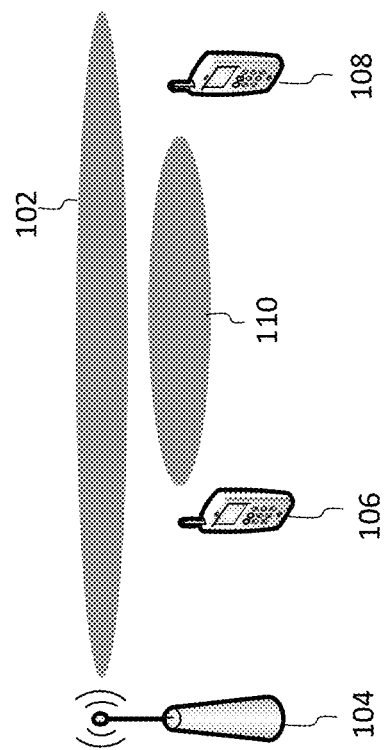
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a gNB 104, a first UE 106, and a second UE 108. A data path 110 may enable the transmission of data (and some control information) on a sidelink (SL) between the first UE 106 and the second UE 108. The control path 102 and the data path 110 may be on the same frequency or may be on different frequencies.

In a wireless communication system, such as, for example, 5G NR, the gNB 104 may transmit, to the first UE 106 and/or the second UE 108, a reference signal for CSI estimation (e.g., CSI-RS) with a periodicity of T slots. The un-precoded downlink (DL) channel estimated by the first UE 106 and/or the second UE 108 at a certain time slot t and for a certain subcarrier is denoted as $H_t \in \mathbb{C}^{N_R \times N_T}$, where $N_R$, $N_T$ are the number of receive antennas (at the UE) and the number of transmit antennas (at the gNB), respectively, and the mathematical notation $A \in C^{a \times b}$ indicates that A is a matrix of complex numbers with dimensions a×b.

According to an embodiment, a method is provided, based on ML, for a UE to predict a sequence of channel matrices at K future time slots, given a sequence of estimated channel matrices at N past time slots. The predicted channel matrices may be used to improve the accuracy of CSI parameter feedback (e.g., precoding matrix or PMI) sent by the UE to the BS (or gNB).

Figure 2:
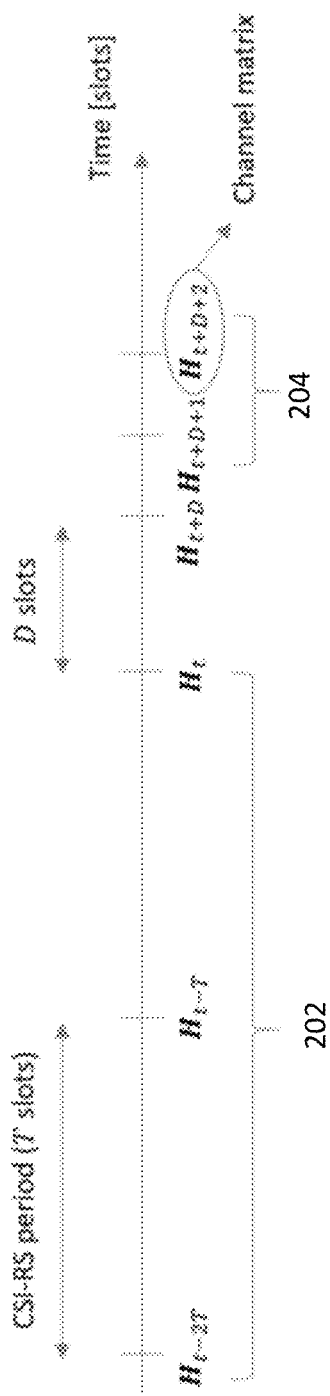
FIG. 2 is a diagram illustrating channel matrix prediction, according to an embodiment.

FIG. 2 is a diagram illustrating channel matrix prediction, according to an embodiment. A method is provided, which applies element-wise prediction of a channel matrix. Specifically, prediction is performed for each transmission/reception (Tx/Rx) antenna and subcarrier separately. This results in a relatively low complexity, because the NN receives N complex numbers as input 202 and provides an output 204 of K complex numbers, as opposed to a full matrix of channel coefficients. FIG. 2 illustrates an embodiment in which N=3 and K=2.

A sequence of N past channel observations from CSI-RS slots may be available at a modem (e.g., the modem stores the N estimated channel matrices in a buffer). $\{H_t, H_{t-T}, \ldots, H_{t-(N-1)T}\}$ represents the sequence of estimated channel matrices at past time slots, where t is the current time slot index, N is the number of past time slots used as input for prediction, and T is the periodicity of past channel measurements and CSI-RS transmissions. As shown in FIG. 2, $\{H_t, H_{t-T}, H_{t-2T}\}$ are provided as the input 202 to the NN.

Past observations or channel measurements are not available at every slot, but only at certain slots with periodicity T. This is due to the fact that, in 5G $N_R$ systems, the un-precoded channel can only be measured by the UE in the slots where CSI-RS is transmitted by the gNB. Typical values for CSI-RS periodicity may be T=5, T=10, or T=20 slots. In other words, according to an embodiment, an NN for channel prediction is trained with an incomplete history of past observations, whereas conventional prediction methods generally assume a complete history.

A sequence of channel matrices at future time slots is denoted by $\{H_{t+D+1}, H_{t+D+2}, H_{t+D+K}\}$, where t is the current time slot index, K is the number of future time slots considered for channel prediction, and D is a fixed delay (in slots), which accounts for the time between the PMI being reported by the UE and the precoder being applied by the gNB. For example, there may be a fixed delay of D=10 slots. As shown in FIG. 2, the NN provides $\{H_{t+D+1}, H_{t+D+2}\}$ as the output 204.

After performing the prediction, the UE may utilize the sequence of predicted channel matrices $\{H_{t+D+1}, H_{t+D+2}, \ldots, H_{t+D+K}\}$ to determine a CSI parameter. For example, the sequence of predicted channel matrixes may be used to determine a precoding matrix and report the corresponding index (e.g., PMI) to the gNB. However, the CSI parameter may also be a rank indicator (RI) or a channel quality indicator (CQI). The specific PMI selection algorithm may depend on system configurations (e.g., implicit or explicit feedback, codebook type, quantization/compression options, etc.). For example, SVD may be performed on a last predicted channel matrix (i.e., $H_{t+D+K}$), and the PMI that best approximates the right singular vectors of $H_{t+D+K}$ may be selected by the UE.

The gNB is expected to apply a precoding matrix based on the UE's PMI report during a number of future time slots. For this reason, a PMI report that takes into account the future (predicted) channel matrices may be more accurate than a PMI report based on a current measured channel matrix.

The operations described in present disclosure show gains up to 1.9 decibels (dB) (measured in terms of signal-to-noise ratio (SNR) difference at 10% block error rate (BLER)) compared to conventional PMI selection (with no channel matrix prediction), while having lower complexity than the conventional methods.

Different types of NNs may be used for channel prediction, such as, for example, a multi-layer perceptron (MLP) NN, a recurrent neural network (RNN), a long short-term memory (LSTM) network, a temporal convolutional network (TCN), and a transformer NN.

Figure 3:
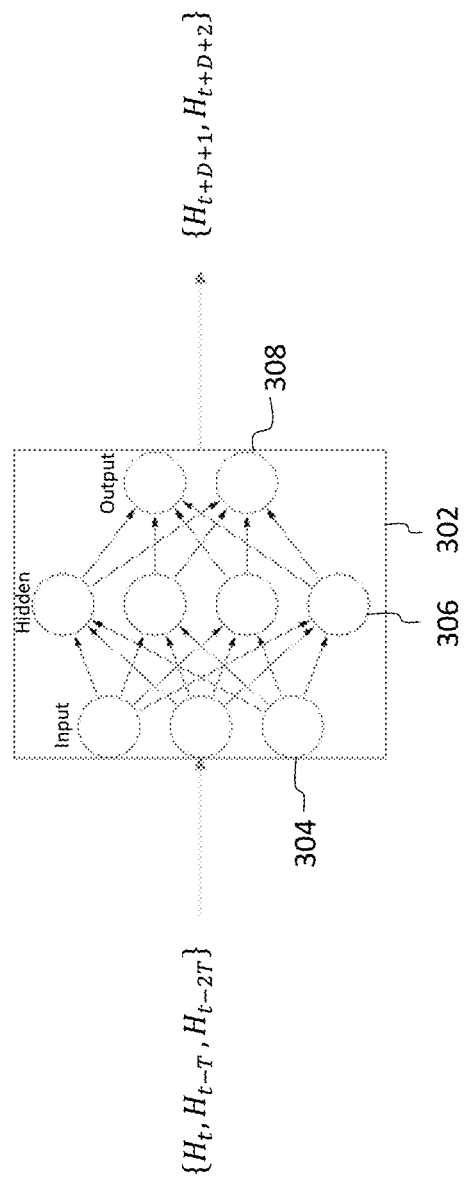
FIG. 3 is a diagram illustrating an NN of FIG. 2, according to an embodiment.

FIG. 3 is a diagram illustrating an NN of FIG. 2, according to an embodiment. $\{H_t, H_{t-T}, H_{t-2T}\}$ are shown as the three complex inputs N to an NN 302, and $\{H_{t+D+1}, H_{t+D+2}\}$ are shown as the two complex outputs K from the NN 302. The NN 302 of FIG. 3 is shown with three input nodes 304, four hidden nodes 306, and two output nodes 308. However, this embodiment is provided for illustrative purposes and does not limit the network structure (e.g., architecture, number of hidden layers, number of nodes, etc.).

The input and output size reported in FIG. 3 assumes element-wise processing of the channel matrices (i.e., each Tx/Rx antenna and subcarrier is processed separately), resulting in low complexity due to the low input/output size (N complex numbers as input, K complex numbers as output). The N complex numbers may be input to the NN 302 as 2N real numbers (N real parts and N imaginary parts), and the K complex numbers may be output from the NN 302 as 2K real numbers (K real parts and K imaginary parts). Alternatively, the NN 302 can be trained using only the real part or the imaginary part with N inputs and K outputs. When only the time dimension is considered, the NN 302 may not account for channel correlations in the frequency and/or spatial domain, which the NN 302 may learn and exploit for prediction.

The NN 302 may be trained by a dataset including sequences of N past estimated channel matrices (e.g., from CSI-RS slots), and corresponding sequences of K future channel matrices, generated by computer simulations or experimental data, to serve as labels or ground truth.

NN training may be performed offline and separately for different channel profiles, Doppler frequencies, modulation and coding schemes (MCSs), SNR, and other system parameters. Through the training process, the NN 302 determines a set of weights. When the trained NN 302 is used in channel matrix prediction, the NN 302 applies the weights learned for the system parameters that most closely resemble the current operating conditions, to predict future channel sequences given past channel sequences as input.

Figure 4:
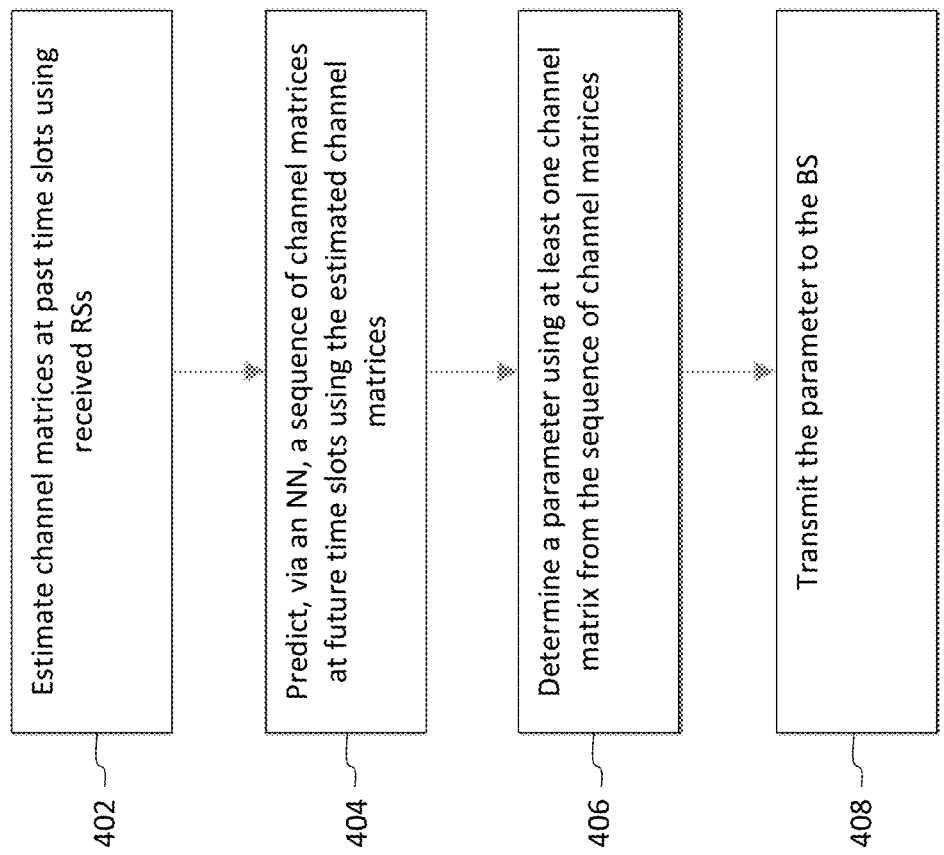
FIG. 4 is a flowchart illustrating a method for channel prediction and parameter selection, according to an embodiment.

FIG. 4 is a flowchart illustrating a method for channel prediction and parameter selection, according to an embodiment. At 402, channel matrices at past time slots are estimated using received RSs. The RSs may be CSI-RSs for CSI estimation, and the past time slots may be separated by a CSI interval. The estimated channel matrices may include interpolated channel matrices at time slots between the past time slots of the RSs, as described in greater detail below with reference to FIGS. 7 and 8. The estimated channel matrices may include channel matrices across a frequency band at each past time slot, as described in greater detail below with reference to FIGS. 5 and 6. The estimated channel matrices may be stored in a buffer of the UE.

At 404, a sequence of channel matrices are predicted at future time slots, via an NN, using the estimated channel matrices. The channel matrices may be input to the NN as corresponding complex numbers, or real and imaginary parts of the corresponding complex numbers. The sequence of channel matrices may be output from the NN as a corresponding sequence of complex numbers, or real and imaginary parts of the corresponding sequence of complex numbers. One or more weights may be applied in the NN based on a comparison of current channel conditions to different channel profiles used to train the NN.

At 406, a parameter is determined using at least one channel matrix from the sequence of channel matrices. At 408, the parameter is transmitted to the BS. The BS may be a gNB. The future time slots may be separated from a current time slot by at least a time required to transmit the parameter to the BS and apply the parameter at the BS.

The parameter may be a PMI, and the PMI may be selected from the predicted sequence of channel matrices $\{H_{t+D+1}, H_{t+D+2}, \ldots, H_{t+D+K}\}$ in different ways. For example, the last predicted channel matrix $H_{t+D+K}$ (i.e., $H_{t+D+2}$ in the FIG. 3) may be used. From this last predicted channel matrix, a precoding matrix may be determined by SVD or by other signal processing techniques. Thereafter, the corresponding PMI may be selected from a codebook (e.g., Type-I, Type-II, eType-II, etc.) by selecting the PMI within the codebook that best approximates the precoding matrix obtained by SVD.

In other embodiments, the entire predicted sequence of channel matrices $\{H_{t+D+1}, H_{t+D+2}, \ldots, H_{t+D+K}\}$ may be used to determine the PMI through averaging or other techniques.

The input size to the NN may be increased to include multiple subcarriers of PMI sub-bands (to capture frequency correlations) and/or multiple Tx/Rx antennas (to capture spatial correlations).

When only the time dimension is considered, the input to/output from the NN includes channel time sequences, and there is separate processing for each Tx/Rx antenna and each subcarrier, as described above with respect to FIGS. 2 and 3.

When both time and frequency dimensions are considered, the input to/output from the NN includes channel time sequences for multiple frequency components (e.g., subcarriers or PMI sub-bands), and there is separate processing for each Tx/Rx antenna. The input to the NN is $N \times N_f$ complex numbers, and the output from the NN is $K \times N_f$ complex numbers, where $N_f$ is the number of frequency components.

When time, frequency, and spatial dimensions are considered, the input to/output from the NN includes channel time sequences for multiple subcarriers or PMI sub-bands and multiple Tx/Rx antennas. The input to the NN is $N \times N_f \times N_R \times N_T$ complex numbers, and the output from the NN is $K \times N_f \times N_R \times N_T$ complex numbers.

As described above, the prediction may rely on available channel measurements obtained in the CSI-RS slots (with periodicity 7). In alternate embodiments, the incomplete history (i.e., missing channel observations between CSI-RS slots) may be mitigated by applying pre-processing to fill samples between the CSI-RS slots (e.g., interpolation techniques such as time-domain minimum mean square error (TD-MMSE)), applying non-ML methods (e.g., Kalman filter, autoregressive models, etc.) to estimate the missing samples, and applying ML methods (e.g., autoregressive integrated moving average (ARIMA), light gradient-boosting machine (LightGBM), extreme gradient boosting (XG-Boost), etc.) to estimate the missing samples.

Four approaches are described in detail below, which differ in terms of input dimension (e.g., time vs. time and frequency) and input samples (e.g., with or without interpolation).

Figure 5:
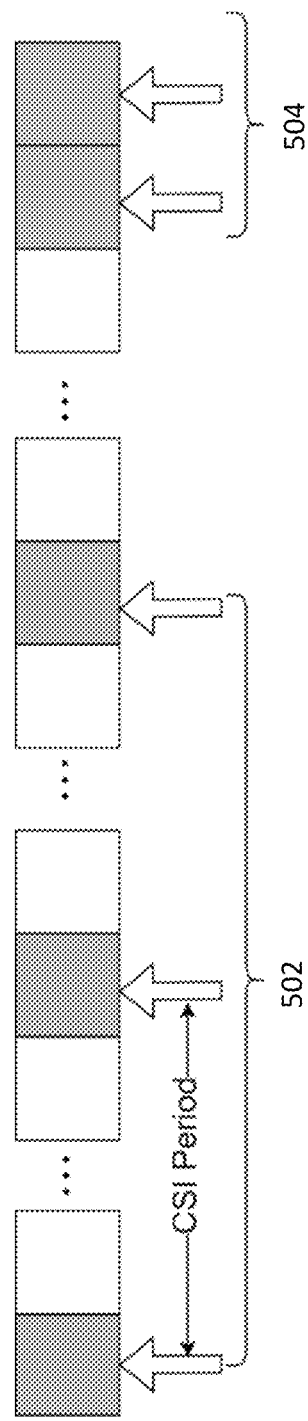
FIG. 5 is a diagram illustrating one-dimensional NN input without interpolation, according to an embodiment.

FIG. 5 is a diagram illustrating one-dimensional NN input without interpolation, according to an embodiment. Specifically, only time dependencies are considered. As illustrated in FIG. 5, an input 502 to a NN includes three channel matrices in a time dimension, each separated by a CSI period. An output 504 from the NN includes two channel matrices. This approach is similar to that described above with respect to FIGS. 2 and 3.

Figure 6:
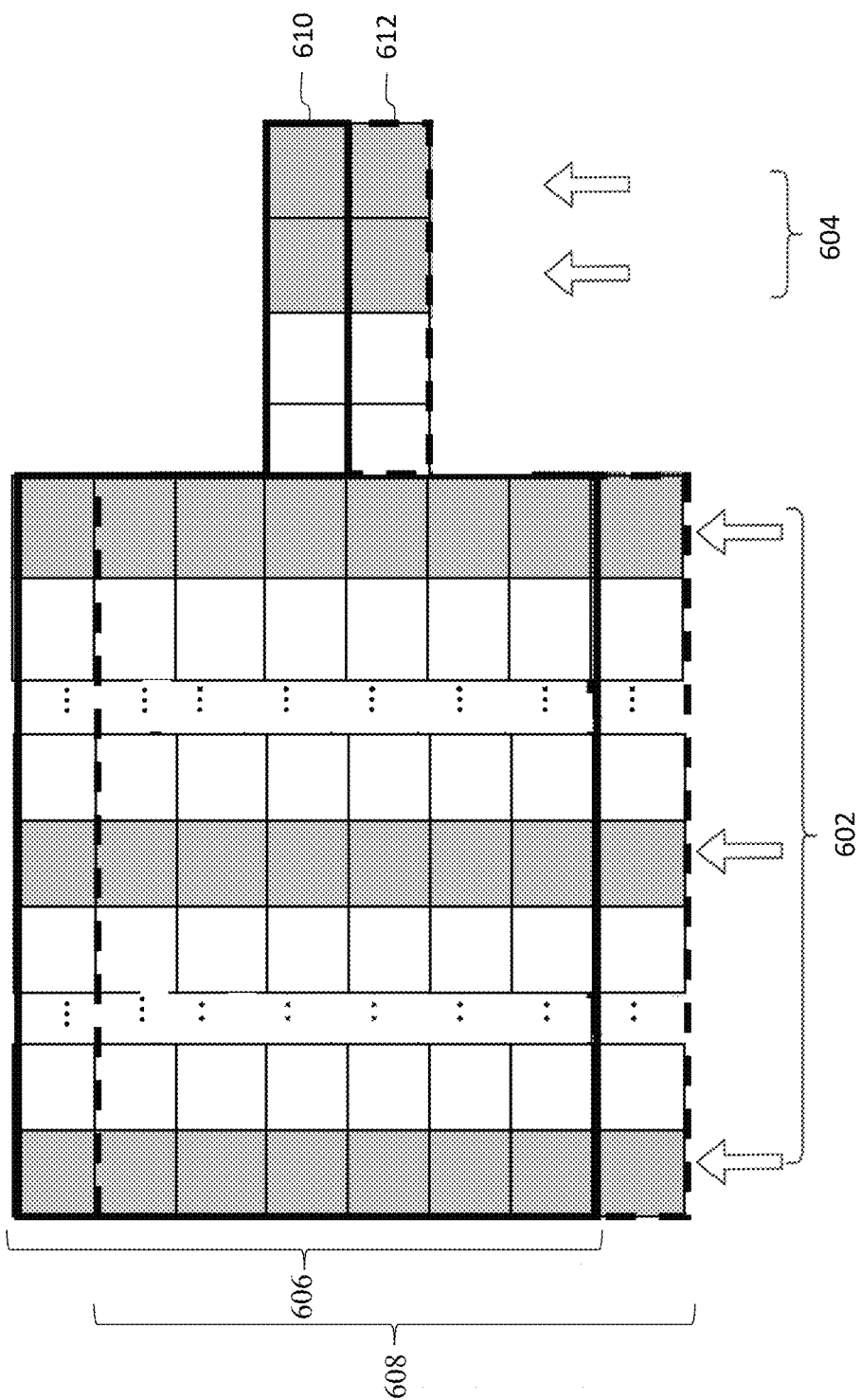
FIG. 6 is a diagram illustrating two-dimensional NN input without interpolation, according to an embodiment.

FIG. 6 is a diagram illustrating two-dimensional NN input without interpolation, according to an embodiment. Specifically, both time and frequency dependencies are considered. A sliding window operation is provided to capture the correlation of input features with the adjacent subcarriers. In order to predict a channel for a given subcarrier, an input 602 to a NN includes a first window 606 of channel matrices. The first window includes three channel matrices in the time direction (each separated by a CSI period) and seven channel matrices in the frequency direction. The seven channel matrices in the frequency direction are centered on the given subcarrier, with three subcarriers above and below. An output 604 from the NN includes two channel matrices 610.

In order to predict a channel for a next subcarrier, a second window 608 is used as input to the NN that is the same size as the first window 606, but is shifted downward in the frequency direction, such that a top-most row of channel matrices of the first window 606 is removed and a new row of channel matrices is added as a bottom-most row of the second window 608. Accordingly, the seven channel matrices in the frequency direction are centered on the next subcarrier, with three subcarriers above and below. When the second window 608 is used as input to the NN, two channel matrices 612 are output. While FIG. 6 illustrates windows having a size of three channel matrices in the time direction and seven channel matrices in the frequency direction, this is for illustrative purposes only, and embodiments are not limited to the window size shown.

Figure 7:
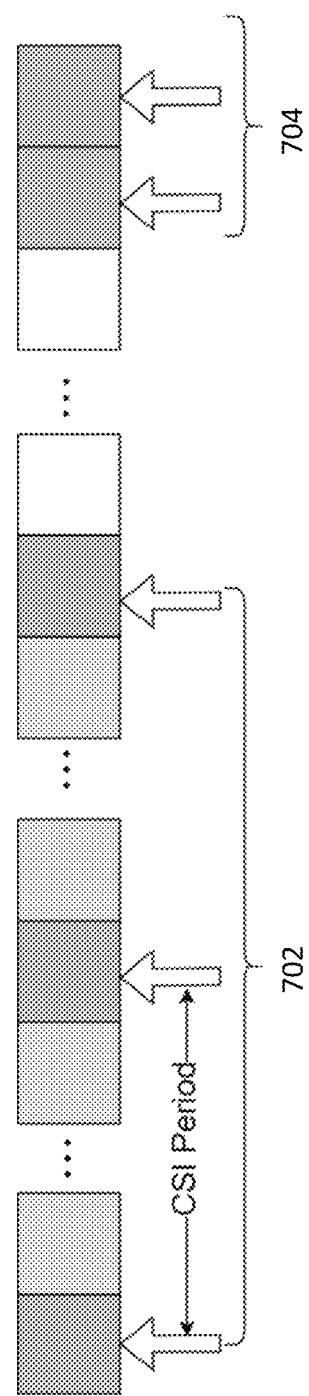
FIG. 7 is a diagram illustrating one-dimensional NN input with interpolation, according to an embodiment.

FIG. 7 is a diagram illustrating one-dimensional NN input with interpolation, according to an embodiment. FIG. 7 is analogous to FIG. 5 except samples between CSI-RS slots (e.g., within the CSI period) may be recovered by TD-MMSE interpolation, for example, to mitigate the incomplete history. Accordingly, input channel matrices 702 of FIG. 7 include the input channel matrices 502 of FIG. 5 as well as the interpolated channel matrices between the input channel matrices 502. An output 704 from the NN includes two channel matrices.

Figure 8:
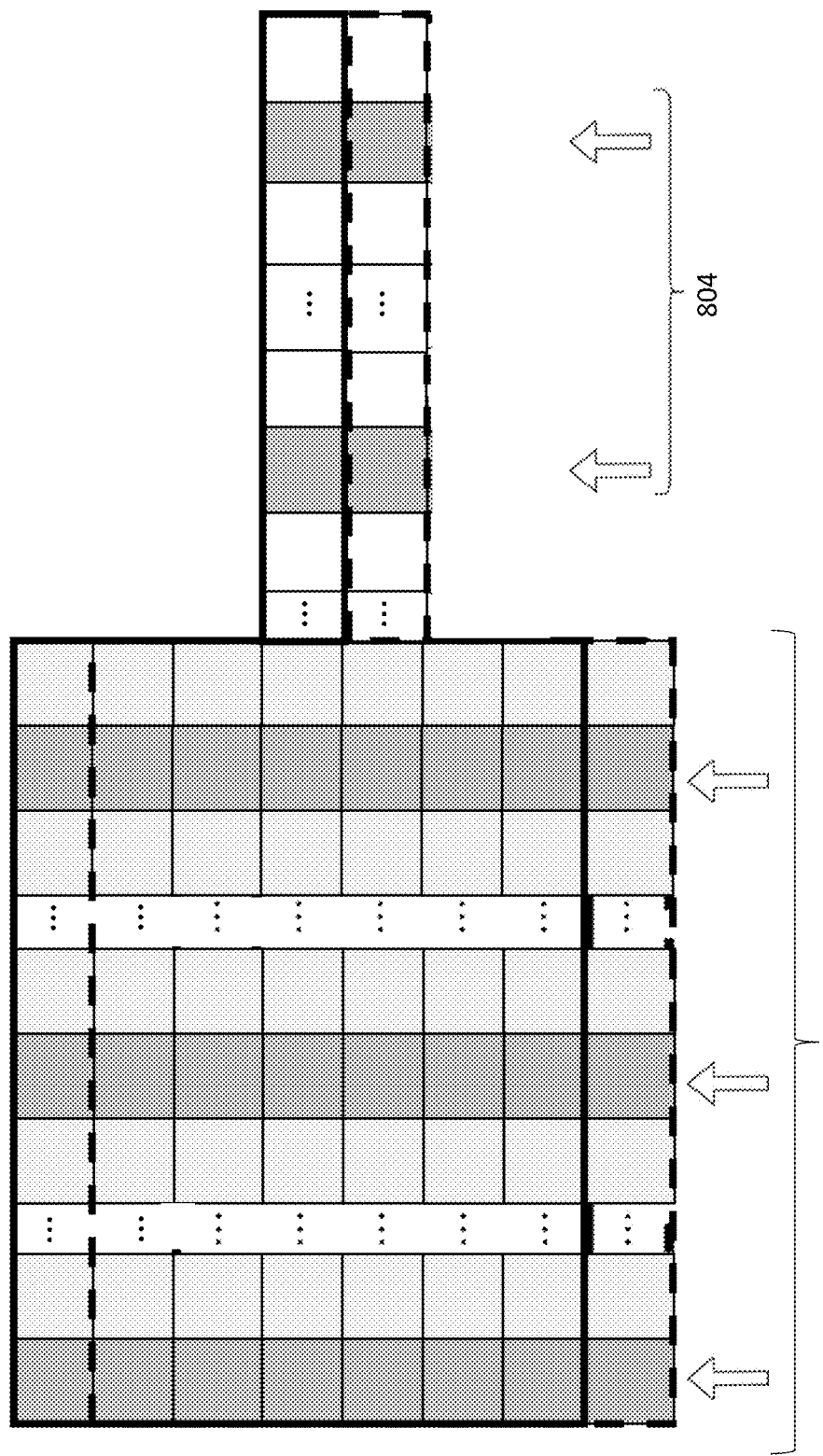
FIG. 8 is a diagram illustrating two-dimensional NN input with interpolation, according to an embodiment.

FIG. 8 is a diagram illustrating two-dimensional NN input with interpolation, according to an embodiment. FIG. 8 is analogous to FIG. 6, but samples between CSI-RS slots (e.g., within the CSI period) may be recovered by TD-MMSE interpolation, for example, to mitigate the incomplete history. Accordingly, for each respective window, input channel matrices 802 of FIG. 8 include the input channel matrices 602 of FIG. 6 as well as the interpolated channel matrices between the input channel matrices 802 in each subcarrier row. An output 804 from the NN includes two channel matrices for each input window. While FIG. 8 illustrates windows having a size of three channel matrices in the time direction and seven channel matrices in the frequency direction, this is for illustrative purposes only, and embodiments are not limited to the window size shown.

Delivery of samples from a modem to a neural processing unit (NPU), and vice-versa, may be performed without any compression/decompression. However, in some embodiments, down-sampling (e.g., by a factor of two), matrix-based compression, and/or dataset distillation/abstraction may be applied for sample compression (from modem to NPU) and decompression (from NPU to modem).

Interference may vary with time, such that interference at current or past slots may be different from interference at future slots. Accordingly, interference whitening may be applied to a CSI-RS estimated channel before providing it as input to the NN. In other embodiments, hierarchical or hybrid models may be applied, in which a classifier is used to find an interference pattern, assuming some interferences are similar and cardinality is limited. Thereafter, different interference patterns can be mitigated by using corresponding models at the NN.

The number of future slots for channel prediction (K) may be adjusted based on several parameters, including the NN architecture, Doppler frequency, feedback delay between the UE and the gNB, etc.

Multiple UEs can jointly perform channel prediction in a federated learning framework. In this scenario, the UE may communicate with a central node (e.g., a server or a gNB).

Figure 9:
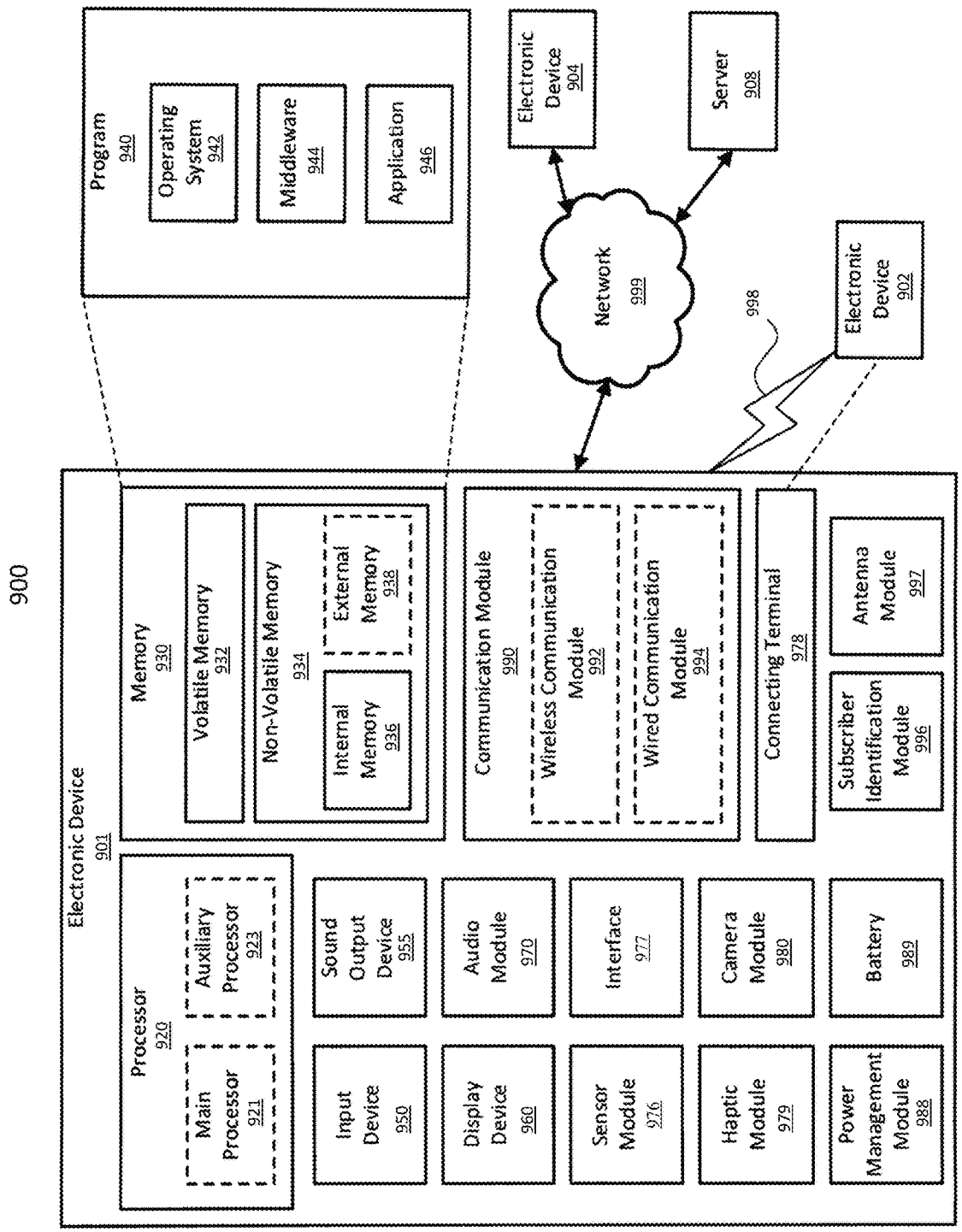
FIG. 9 is a block diagram of an electronic device in a network environment, according to an embodiment.

FIG. 9 is a block diagram of an electronic device in a network environment, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 902 may be embodied as the UE described above with respect to FIGS. 1-8, and may communicate with a gNB via the second network 999. The electronic device 901 may communicate with the electronic device 904 via the server 908. The electronic device 901 may include a processor 920, a memory 930, an input device 940, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 994. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations. The processor 920 may perform the operations of the UE described above with respect to FIG. 4 using instructions from the memory 930.

As at least part of the data processing or computations, the processor 920 may load a command or data received from another component (e.g., the sensor module 946 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile sub scriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   estimating, by a user equipment (UE), channel matrices at time slots using reference signals received from a base station (BS) at the time slots;
   predicting, by the UE, a sequence of channel matrices at future time slots using the estimated channel matrices as input to a neural network (NN) trained based on known sets of past and future channel matrices; and
   determining, by the UE, a parameter using at least one channel matrix from the sequence of channel matrices.

2. The method of claim 1, further comprising:
   storing the estimated channel matrices in a buffer of the UE; and
   transmitting the parameter from the UE to the BS.

3. The method of claim 1, wherein the reference signals are for channel state information (CSI) estimation, and the time slots are separated by a CSI interval.

4. The method of claim 1, wherein the future time slots are separated from a current time slot by at least a time required to transmit the parameter from the UE to the BS and apply the parameter at the BS.

5. The method of claim 1, wherein the parameter is a precoding matrix indicator (PMI) and determining the parameter comprises:
   determining a precoding matrix based on the at least one channel matrix; and
   selecting the PMI based on the precoding matrix.

6. The method of claim 1, wherein, in predicting the sequence of channel matrices:
   the estimated channel matrices are input to the NN as corresponding complex numbers and the sequence of channel matrices are output from the NN as a corresponding sequence of complex numbers; or
   the estimated channel matrices are input to the NN as real parts and imaginary parts of the corresponding complex numbers and the sequence of channel matrices are output from the NN as real parts and imaginary parts of the corresponding sequence of complex numbers.

7. The method of claim 1, wherein estimating the channel matrices comprises:
   estimating primary channel matrices from the reference signals at the time slots; and
   interpolating secondary channel matrices at time slots between the time slots using the estimated primary channel matrices.

8. The method of claim 1, wherein the estimated channel matrices comprise a plurality of channel matrices across a frequency band at each time slot.

9. The method of claim 8, wherein:
   in predicting the sequence of channel matrices for a given subcarrier, a first window is provided as input to the NN, and two channel matrices are output from the NN, wherein the first window spans the time slots and a number of subcarriers is centered on the given subcarrier; and
   in predicting a sequence of channel matrices for a next subcarrier, a second window is provided as input to the NN, and another two channel matrices are output from the NN, wherein the second window spans the time slots and the number of subcarriers in the second window is centered on the next subcarrier and shifted downward by one subcarrier from the first window.

10. The method of claim 1, further comprising:
    training the NN using the known sets of past and future channel matrices at different channel profiles; and
    determining weights for the different channel profiles,
    wherein predicting the sequence of channel matrices comprises:
      applying one or more of the weights in the NN based on a comparison of current channel conditions to the different channel profiles.

11. A user equipment (UE) comprising:
    a processor; and
    a non-transitory computer readable storage medium storing instructions that, when executed, cause the processor to:
      estimate channel matrices at time slots using reference signals received from a base station (BS) at the time slots;
      predict a sequence of channel matrices at future time slots using the estimated channel matrices as input to a neural network (NN) trained based on known sets of past and future channel matrices; and
      determine a parameter using at least one channel matrix from the sequence of channel matrices.

12. The UE of claim 11, wherein the instructions further cause the processor to:
    store the estimated channel matrices in a buffer of the UE; and
    transmit the parameter from the UE to the BS.

13. The UE of claim 11, wherein the reference signals are for channel state information (CSI) estimation, and the time slots are separated by a CSI interval.

14. The UE of claim 11, wherein the future time slots are separated from a current time slot by at least a time required to transmit the parameter from the UE to the BS and apply the parameter at the BS.

15. The UE of claim 11, wherein the parameter is a precoding matrix indicator (PMI) and, in determining the parameter, the instructions further cause the processor to:
determine a precoding matrix based on the at least one channel matrix; and
select the PMI based on the precoding matrix.

16. The UE of claim 11, wherein, in predicting the sequence of channel matrices:
the estimated channel matrices are input to the NN as corresponding complex numbers and the sequence of channel matrices are output from the NN as a corresponding sequence of complex numbers; or
the estimated channel matrices are input to the NN as real parts and imaginary parts of the corresponding complex numbers and the sequence of channel matrices are output from the NN as real parts and imaginary parts of the corresponding sequence of complex numbers.

17. The UE of claim 11, wherein, in estimating the channel matrices, the instructions further cause the processor to:
estimate primary channel matrices from the reference signals at the time slots; and
interpolate secondary channel matrices at time slots between the time slots using the estimated primary channel matrices.

18. The UE of claim 11, wherein:
the estimated channel matrices comprise a plurality of channel matrices across a frequency band at each time slot;
in predicting the sequence of channel matrices for a given subcarrier, a first window of channel matrices is provided as input to the NN, and two channel matrices are output from the NN, wherein the first window spans the time slots and a number of subcarriers is centered on the given subcarrier; and
in predicting a sequence of channel matrices for a next subcarrier, a second window of channel matrices is provided as input to the NN, and another two channel matrices are output from the NN, wherein the second window spans the time slots and the number of subcarriers in the second window is centered on the next subcarrier and shifted downward by one subcarrier from the first window.

19. The UE of claim 11, wherein:
the instructions further cause the processor to:
train the NN using previously determined sets of past and future channel matrices at different channel profiles; and
determine weights for the different channel profiles, and
in predicting the sequence of channel matrices, the instructions further cause the processor to apply one or more of the weights in the NN based on a comparison of current channel conditions to the different channel profiles.

20. A system comprising:
a user equipment (UE) configured to receive reference signals, estimate channel matrices at time slots using the reference signals, predict a sequence of channel matrices at future time slots using the estimated channel matrices as input to a neural network (NN) trained based on known sets of past and future channel matrices, determine a parameter using at least one channel matrix from the sequence of channel matrices, and transmit the parameter; and
a base station configured to transmit the reference signals to the UE at the time slots, and receive the parameter from the UE.

* * * * *